United States Patent [19]

Meier et al.

[11] 4,292,933
[45] Oct. 6, 1981

[54] FURNACE

[75] Inventors: Daniel Meier; Carl Maendel, both of Rifton, N.Y.

[73] Assignee: Hutterian Society of Brothers, Rifton, N.Y.

[21] Appl. No.: 92,550

[22] Filed: Nov. 8, 1979

[51] Int. Cl.³ .............................................. F22B 9/02
[52] U.S. Cl. .................................... 122/114; 122/123; 122/20 B; 122/421; 165/DIG. 2
[58] Field of Search ............. 122/114, 421, 123, 20 B, 122/DIG. 1; 237/8 R, 56, 55; 126/367, 368, 110 R; 165/DIG. 2

[56] References Cited

U.S. PATENT DOCUMENTS 884,875 4/1908 Szdor ................................. 126/367
1,771,592 7/1930 Summers .......................... 122/20 B

OTHER PUBLICATIONS

Hill R, *Stick Wood Furnace*, Reserch Paper, University of Maine, Oct. 25, 1978.

Primary Examiner—Albert J. Makay
Assistant Examiner—Henry Bennett
Attorney, Agent, or Firm—John Maier, III

[57] ABSTRACT

A furnace with a combustion compartment and a heat exchanger compartment connected by a channel having a secondary air inlet for efficiently burning wood and absorbing the heat of combustion.

7 Claims, 8 Drawing Figures

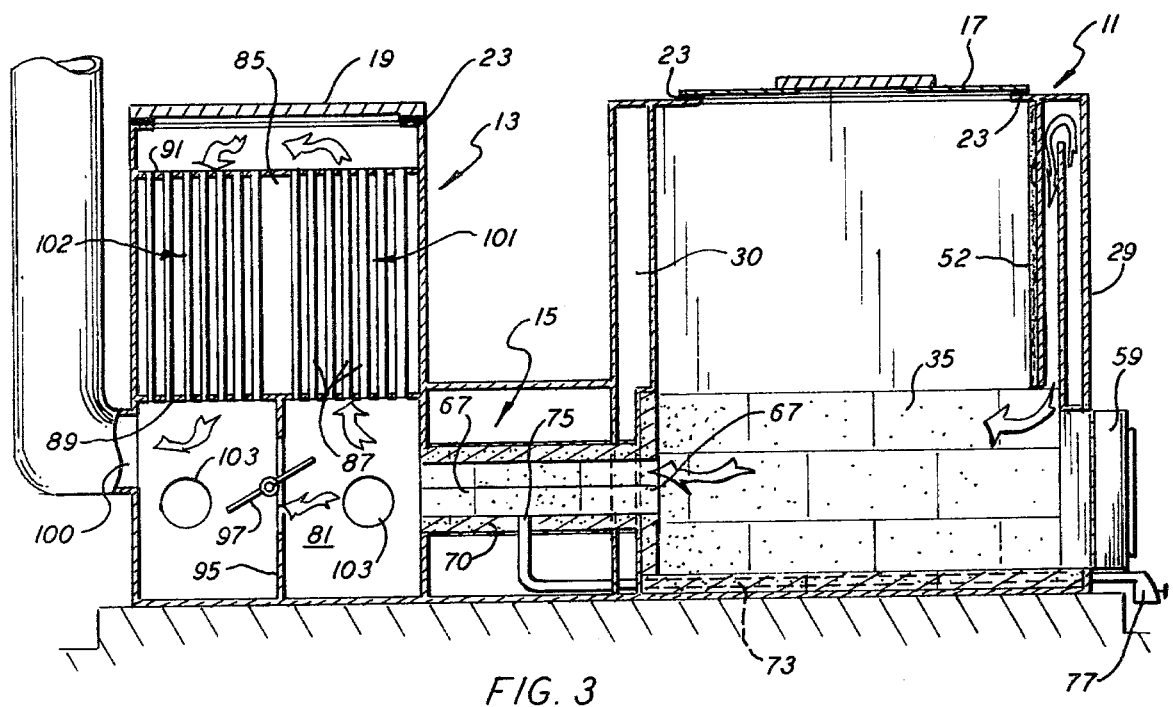
FIG. 3
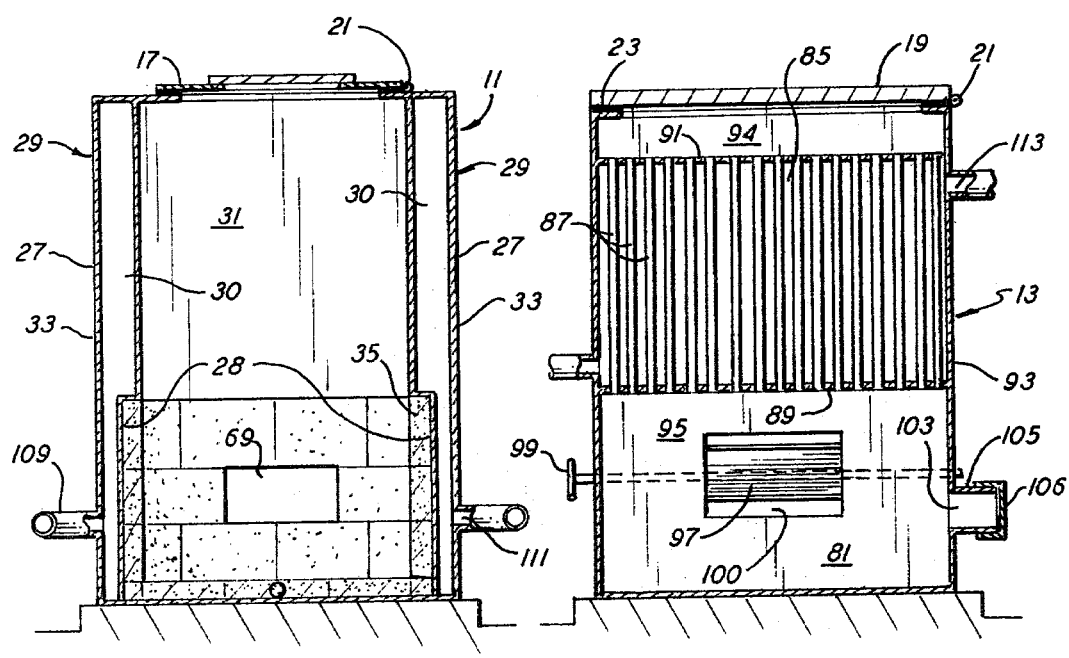
FIG. 4
FIG. 6

FURNACE

BACKGROUND OF THE INVENTION

The present invention relates to a furnace and more specifically to a double compartment wood-fired furnace particularly adaptable for heating hot water for both domestic usage and heating purposes.

Furnaces and wood-burning furnaces are well known. However, in view of the energy shortage, particularly in the form of oil and gas, it has become increasingly popular, particularly in the wooded rural areas, to utilize the renewable wood supply as a heat source. Heating in a plurality of stoves produces uneven heat and the problem of ashes and dirt throughout the living quarters of a home. Therefore, it is particularly beneficial to utilize a centrally-located furnace, preferable situated in the basement or boiler room of the structure being heated. In view of the effort or expense required to gather wood, it is necessary that a wood-burning furnace be highly efficient and that as much heat as possible be made available from the wood. In order to achieve such efficiency, complete combustion and burning are necessary along with a high rate of absorption of the heat to the fluid media being used to transfer the heat to the various living quarters. It is also essential that such a furnace be easily stoked with wood and that the wood pieces utilized have a comparatively long length. It is further essential that the fire burn a long period of time on each load of wood while providing means for controlling the heat output.

A great deal of research has been done in the area of wood burning particularly the work done at the University of Maine. The instant invention utilizes the background from this research while improving upon it to produce an efficient wood-burning heating unit with complete combustion and high heat extraction.

These and various other problems were not satisfactorily resolved until the emergence of the instant invention.

SUMMARY OF THE INVENTION

In accordance with the present invention, there is provided a double compartment furnace. The first or fire-box compartment is easily loaded from the top with wood of a comparatively large size. The furnace includes a means of draft control for the supply of air into the fire-box compartment. Initial combustion occurs in this first or fire-box compartment. The flue gases leave this compartment through a channel where secondary combustion air can be introduced to assure secondary burning of the unburned combustion gases resulting in high temperatures for wood burning, namely a heat level in the area of fifteen hundred degrees Farenheit. From the channel, the gases flow into a second or heat-exchanger compartment. At the lower portion of the heat-exchanger compartment there is a baffle. In the upper portion of the heat-exchanger compartment there is a series of fire tubes. The gas flows upward through one half of the fire tubes and then over and down the other half of the fire tubes and then out to the stack.

The novel features which are considered as characteristics of the invention are set forth with particularity in the appended claims. The invention itself, however, as to its construction and obvious advantages, will be best understood from the following description of the specific embodiment when read with the accompanying drawings.

DESCRIPTION OF THE DRAWINGS

FIG. 3 is a cross-sectional view taken along line 3—3 of FIG. 2.

FIG. 4 is a cross-sectional view taken along line 4—4 of FIG. 2.

FIG. 5 is a cross-sectional view of the secondary air inlet.

FIG. 6 is a cross-sectional view taken along line 6—6 of FIG. 2.

FIG. 7 is a cross-sectional view taken along line 7—7 of FIG. 2.

FIG. 8 is a perspective view of a special grate utilized for burning compressed sawdust.

DETAILED DESCRIPTION

Figure 1:
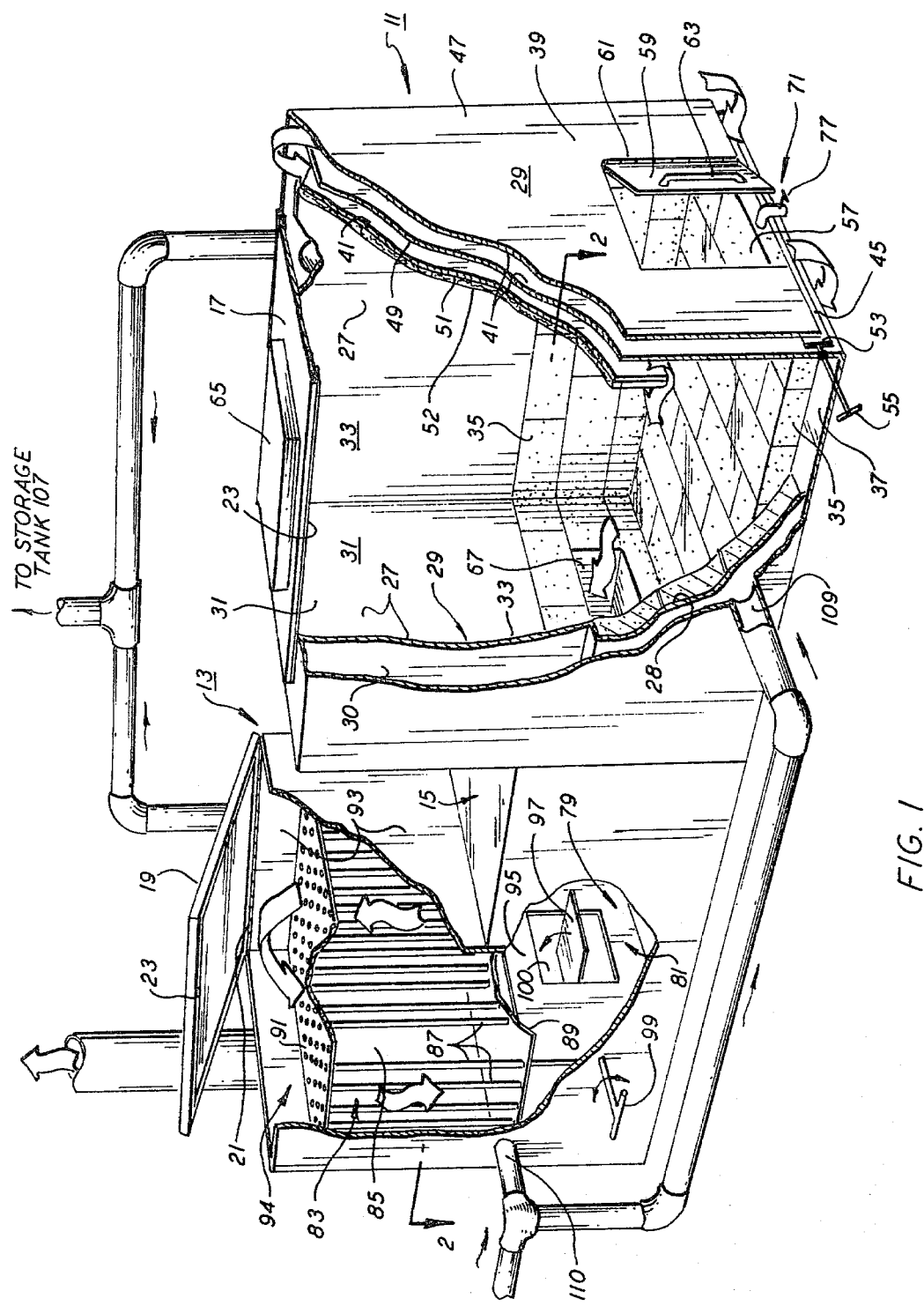
FIG. 1 is a perspective view of the entire furnace with portions of both the fire-box compartment and the heat-exchanger compartment partially broken away.
Figure 2:
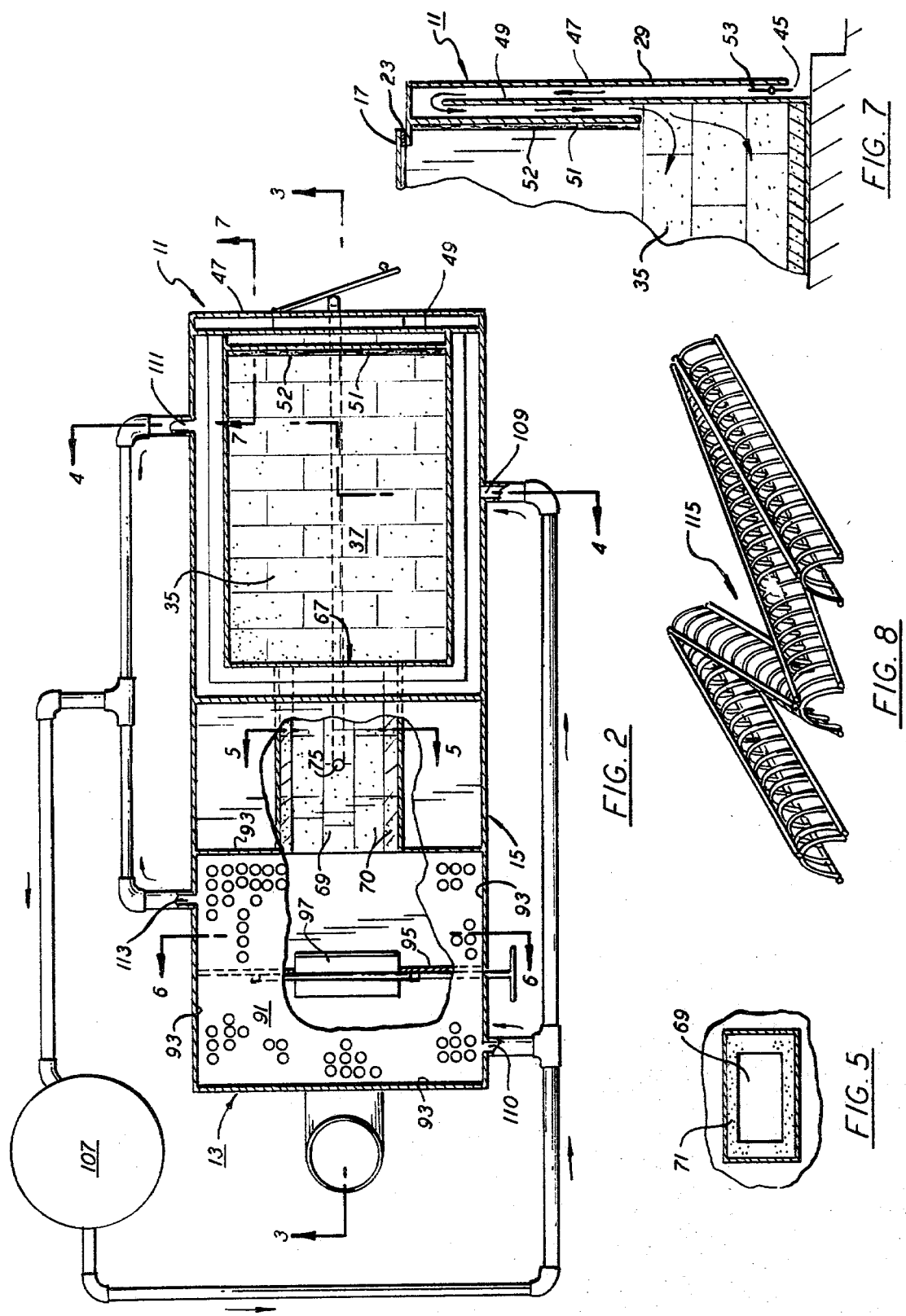
FIG. 2 is a top cross-sectional view of the entire furnace.

The same reference numerals are used throughout the drawings and specification to note a similar item of the invention.

Referring now to FIG. 1, there is shown both a first or fire-box compartment 11 and a second or heat-exchanger compartment 13. The first and second compartment 11, 13 are connected by a channel 15. Both the fire-box compartment 11 and heat-exchanger compartment 13 are both preferably rectangular in shape. The fire-box compartment has a lid 17 and the heat-exchanger compartment 13 has a lid 19. Both lids 17, 19 are pivotably mounted on one edge by hinges 21 at the top surface 22 of their respective compartments 11, 13. Between each of the lids 17, 19 and both of the two compartments 11, 13 there is an asbestoes gasket 23 to insure an air tight seal.

Three vertical walls 27 of the four vertical walls 29 of the fire-box compartments 11, namely the back wall 31 and the two side walls 33, have double partitions thereby forming a water-jacket 30 between the partitions. The same three vertical walls 27 of the fire-box compartment 11 are lined in their lower portion with fire-brick 35 as is the bottom 37 of the fire-box compartment 11. Where the fire-brick lining 35 is located on the three vertical walls 27, there is a recess 28. Due to this recess 28, the water jacket 30 where the fire-bricks 35 are located is narrower. As a result the inner surface of the three walls 27 is even when the fire-bricks 35 are in place. The front wall 39 of the fire-box compartment 11 is not water-lined but includes three vertical partitions 41 to form an air inlet 45 for the introduction of combustion air into the fire-box compartment 11. The three partitions 41 preheat the combustion air while also cooling the front wall. The combustion air enters at the lower edge between an outside partition 47 and an intermediate partition 49 and then flows upwardly between those two partitions 47, 49. The intermediate partition 49 is slightly shorter at the top permitting the combustion air to flow over the top of the intermediate partition 49 and then downwardly between the intermediate partition 49 and an inner partition 51. The inner partition 51 on its interior surface is covered with insulation 52 to prevent warping of the inner partition 51. The inner partition 51 only extends downwardly to approximately the upper level of the fire-brick 35 on the other three walls so at that point, the combustion air enters the fire-box compartment 11. An air damper 53 is pivotably mounted at the lower edge between the outside partition 47 and the intermediate partition 49. An outer handle 55 serves manually to pivot the air damper 53 and thereby control the flow of combustion air into the fire-box compartment 11. An ash opening 57 is provided in the outside partition 47 for ash removal and an ash door 59 is provided to close the ash opening 57. The ash door 59 is pivotably mounted at one side edge on the outside partition 47 by hinges 61. A handle 63 on the ash door 59 serves to open and close the ash door 59.

The ash opening 57 provided for ash removal is sealed between the outside partition 47 and the intermediate partition 49 to prevent the combustion air from flowing directly into the fire-box compartment 11. The ash opening 57 is located in the lower portion of the outside partition 47 and the intermediate partition 49 below the lower edge of the inner partition.

The lid 17 of the fire-box compartment 11 may be swung open for feeding large logs into the fire-box compartment 11. A small cover 65 is pivotably mounted within the lid 17 to permit visual observation of the fire and to feed smaller chunks of wood or compressed sawdust pellets into the fire-box compartment 11 without opening the lid 17.

In the backwall 31 of the fire-box compartment 11, at the lower portion approximately in the center of the fire-brick 35 mounted in the backwall 31, there is channel opening 67 which extends into a channel 69. The channel 69 is lined with a high-temperature refractory brick 70, as for example, an aluminum oxide fire brick. Such a high-temperature refractory is required as the temperatures reached in the channel, even with wood as a fuel, are extremely high. Secondary air can be injected into the channel 69 through a secondary air inlet 71. Preferably, the secondary air inlet 71 includes an air inlet tube 73 which extends under the fire brick 35 on the bottom 37 of the fire-box compartment 11. Air enters the air inlet tube 73 at the base of the front wall 39. The air is preheated from the heat in the fire-box compartment 11 before it is drawn into the hot products of combustion within the channel 69 through an air outlet 75. A valve 77, located at the opening to the air inlet tube 73 serves to control the flow of air into the secondary air inlet 71.

The channel 69 connects the fire-box compartment 11 to the heat-exchanger compartment 13 at the lower portion of the heat-exchanger compartment 13. Inside the heat-exchanger compartment 13, the lower portion 79 of the heat-exchanger compartment 13 is open so as to serve as a lower gas passageway 81. The upper portion 83 of the heat-exchanger compartment 13 forms a liquid container 85 having a multiplicity of fire-tubes 87 extending vertically through the liquid container 85.

A lower tube sheet 89 and an upper tube sheet 91 extend to four vertical walls 93 of the heat-exchanger compartment 13 to form the liquid container 85. The heat-exchanger compartment 13 does not have double walls which are liquid filled but all four vertical walls contain the liquid within the liquid container 85. The upper tube sheet 91 which forms the top or upper surface of the liquid container 85 is below the top 22 of the heat-exchanger compartment 13. As a result, an upper flue gas passageway 94 is formed.

A baffle 95 is located within the heat-exchanger compartment 13. A flue gas damper 97 may be pivotably mounted within the baffle 95 but a slide damper may also be used. A handle 99 located on the outside of the heat-exchanger compartment 13 serves manually to open and close the flue gas damper 97. A flue gas exit 100 is located directly opposite the channel 69 in the lower gas passageway 81. The baffle 95 is located substantially midway between the channel 69 and the flue gas exit 100. The baffle serves to divide the fire-tubes 87 into a front half 101 of fire-tubes 87 and a rear half 102 of fire-tubes 87.

At the base of one side wall of the heat-exchanger compartment 13, a pair of clean out openings 103 are provided. The clean out openings 103 are located in the lower gas passageway 81 on opposite sides of the baffle 95 for removal of any ash build up that occurs within the lower gas passageway 81 of the heat-exchanger compartment 13. The fire-tubes 87 can be cleaned by opening the top 22 of the heat-exchanger compartment 13 and brushing down the fire tubes 87. The clean out openings 103 may be closed in any suitable manner but threaded nipples 105 can be used to form the openings 103 which are then capped with a threaded cap 106.

In operation, the fire-box compartment 11 is loaded with wood pieces which are ignited in the usual manner. The fire-box compartment 11 being air tight, only the combustion air permitted by the air damper 53 is admitted to support the combustion desired based upon the heat output needed. The products of combustion, including unburnt vaporized material, exit from the fire-box compartment 11 into the channel 69. At this point, secondary air is introduced into the products of combustion through the air inlet 45 causing virtually complete burning of the combustion products in the channel 69. This results in high combustion temperatures being achieved within the channel 69.

The high temperature products of combustion then enter the heat-exchanger compartment 13. During initial startup, the flue gas damper 97 located in the baffle 95 is kept open so as to provide as much natural draft as possible while igniting the fuel. Once combustion of the fuel is established, the baffle 95 is closed. In this way, the products of combustion are forced upwardly through the front half 101 of the fire-tubes 87. At the top of the heat-exchanger compartment 13, the products of combustion pass over by means of the upper flue gas passageway 94 to the rear half 102 of the fire-tubes 87 where the products of combustion are forced downwardly and then out the flue gas exit 100 to a stack (not shown).

Heated liquid, preferably water or a mixture thereof, from the furnace is stored in a large storage tank 107. The cool liquid is introduced both at an inlet 109 near the bottom of one side of the fire-box compartment 11 and at an inlet 110 rear portion of the liquid container 85 adjacent the flue gas exit 100. The liquid leaves the fire-box compartment 11 at an outlet 111 near the top 22 on the opposite side of the fire-box compartment 11 from the inlet 109 and leaves the heat-exchanger compartment 13 at an outlet 111 in the front half 101 of the liquid container 85. A conduit conveys the liquid from the outlets to the storage tank 107 and to the inlets 109, 110. Domestic hot water may be produced from circulating water through a coil (not shown) in the storage tank 107. The building is heated by passing the heated water from the storage tank 107 through the usual radiation surface of a hot water heating system (not shown).

It should be particularly noted that no force draft is utilized and that natural draft is utilized for simple and dependable operation and to avoid any loss of energy from operating fans.

With this furnace, any type of wood may be burned. Heavy logs and chunk wood is preferred. However, sawdust is readily available and usually poses a disposal problem. This furnace is capable of burning sawdust pellets which are sawdust compressed with a slight amount of added moisture. However, when sawdust pellets are used, it is preferred to form an air pocket by use of a grid 115 having a W-shape as best can be seen in FIG. 8. By this small addition, the furnace readily burns sawdust pellets thus serving to eliminate a problem waste product while extracting valuable and needed energy.

The present invention may be embodied in other specific forms without departing from the spirit or essential characteristics thereof. The present embodiments are therefore, to be considered in all aspects as illustrative and not restrictive. The scope of the invention being indicated by the appended claims rather than the foregoing description and all changes which come within the meaning and range of equivalency of the claims are therefore intended to be embraced therein.

We claim:

1. A furnace for burning solid fuel in the presence of air whereby products of combustion are produced, said furnace comprising:

a fire-box compartment being rectangularly-shaped with four vertical walls, three of said four vertical walls being double walls to form a liquid chamber, said fire-box compartment having a means for supplying air into the fire-box compartment and for preheating the air so supplied, said fire-box compartment further including an opening for supplying solid fuel into the fire-box compartment;

a lid pivotably mounted on said fire-box compartment over the opening in the fire-box compartment for sealing the opening in said fire-box compartment for supplying solid fuel into the fire-box compartment;

a heat-exchanger compartment having a top and a bottom, said heat-exchanger compartment including a liquid container with a series of fire-tubes vertically oriented through the liquid container, the liquid container being located below the top of the heat-exchanger compartment to form an upper flue gas passage over the liquid container, said heat-exchanger compartment further including a lower flue gas passageway beneath said liquid container;

a baffle located in said lower flue gas passageway of said heat-exchanger compartment, said baffle having a damper pivotable mounted in it;

a means located partially outside said heat-exchanger compartment for pivoting said damper to open and close said damper;

a channel connecting the fire-box compartment with the lower flue gas passageway in the heat-exchanger compartment to supply products of combustion from the fire-box compartment to the heat exchanger compartment, said lower heat-exchanger compartment having a flue gas exit for discharging the products of combustion, said flue gas exit being located in said lower flue gas passageway opposite from said channel, said baffle being located substantially midway between the channel and the flue gas exit;

a secondary air inlet located in said channel for supplying additional air to the products of combustion in the channel for further combustion; and means for supplying and removing liquid from said liquid chamber and said liquid container.

2. A furnace according to claim 1 wherein said fourth vertical wall includes an outside partition and an intermediate partition and an inner partition, each of said partitions having an upper end, said outside partition and said intermediate partition forming a duct for the flow of air upwardly and said intermediate partition and said inner partition forming a duct for the flow of air downwardly into the fire-box compartment, the upper end of said intermediate partition being slightly below the upper end of said outside partition and said inner partition to permit air to flow over the upper end of said intermediate partition.

3. A furnace according to claim 2 wherein said outside partition and said intermediate partition have openings therein aligned with one another for the removal of burnt fuel from the fire-box compartment, said openings having a door mounted therein.

4. A furnace according to claim 1 wherein said secondary air injector includes a tube located across said channel with at least one end extending outside said channel, said tube having a multiplicity of openings through it.

5. A furnace according to claim 1 wherein said fire-box compartment is partially lined with firebrick.

6. A furnace according to claim 1 further including:
an opening in the top of said heat-exchanger compartment; and
a cover pivotably mounted over said opening in said heat-exchanger compartment.

7. A furnace according to claim 6 wherein said heat-exchanger compartment further includes:
a pair of clean out openings into said passageway, each one of said openings being located on opposite sides of said baffle; and
means for opening and closing said pair of openings.

* * * * *